3,654,197
SULPHUR-CROSSLINKABLE MOLDED SUBSTANCES

Friedrich Seifert, Marl, and Josef Bittscheidt, Datteln, Germany, assignors to Chemische Werke Huls Aktiengesellschaft, Marl, Germany
No Drawing. Filed May 25, 1970, Ser. No. 40,409
Claims priority, application Germany, July 24, 1969, P 19 37 587.2
Int. Cl. C08c 9/14; C08d 9/08
U.S. Cl. 260—4 R
3 Claims

ABSTRACT OF THE DISCLOSURE

Molded substances having improved cold-resistance and being unreactive to stress cracking are formed from mixtures of partly crystalline, partly amorphous, polymers together with small but significant amounts of sulphur-vulcanizable unsaturated rubber and sulphur, with or without an accelerator of vulcanization.

---

The invention is concerned with sulphur-crosslinkable molded substances made from a mixture of partly crystalline and partly amorphous, polymers.

It heretofore had been proposed to make polypropylene resistant to cold by the admixture of rubber in the presence of vulcanizing agents (published German patent application No. "DAS," 1,150,200). Likewise, Canadian Pat. 633,823 describes molded substances containing partly crystalline polypropylene as well as partly crystalline polybutene-1, thereby attaining a polypropylene product that is more cold-resistant and which temperautre-wise facilitates thermoplastic processing. However, the admixture of rubber and crosslinking agents to molded substances, as described for example in said Canadian patent, cannot be considered to be useful or advantageous because the convenience of processing the polypropylene—attained by the content of butene-1—would thus be lost while not recovering the high softening point of the pure polypropylene. Furthermore, due to the admixture of rubber, the polybutene-1 would cease to offer the advantage desired for the polypropylene, namely, an increase in the stiffness of the molded substance, and this without improving the ease of processing.

There exists, however, a requirement for the preparation of molded substances which can be processed with great ease and which possess outstanding characteristics for industrial use.

The present invention solves this problem and attains this object by combining the following substances:

(a) 99.5 to 10 percent by weight of partially crystalline polybutene-1, which component can contain up to 40 percent by weight of non-tactical ("ataktische") components—calculated as to the total amount of polybutene-1—and which possesses an $\eta_{red}$-value of 2 to 6 and a density of 0.910 to 0.920;

(b) 0 to 80 percent by weight of polypropylene which can be a copolymer of 0.2 to 10 percent by weight (calculated as to the copolymer) of ethylene or butene-1, and which possesses an $\eta_{red}$-value of 2 to 5 and a density of 0.901 to 0.907;

(c) 0.4 to 20 percent by weight of unsaturated rubber that can be vulcanized with sulphur; and (d) 0.1 to 3 percent by weight of sulphur, possibly including vulcanization accelerators if their use should be desired.

From mixtures as specified above there are obtained molded substances which are particularly unreactive to stress cracking. They are definitely superior to polybutene-1 per se which latter, standing alone, is very unreactive to stress cracking, and superior to all the mixtures discussed above in connection with the present state of the art. At the same time, the mixtures proposed by the invention do not in any manner limit the scope of processing of the thermoplastic basic materials in the machines provided and designed for such purpose. Therefore, they positively surpass—in this respect, also—crosslinkable polyethylene per se. As proof of this assertion there can be cited the above-mentioned DAS 1,187,789 which suggests the use of an extrusion head, provided with a high frequency field, to overcome the difficulties encountered during the extrusion; also, the publication "Kunststoffe" vol. 57, pages 536 to 538 (1967) which article suggests the use of a specific apparatus. Therefore, the advantages gained from the unexpected results of the new proposal are beyond the scope of the above-discussed state of the art.

A suitable partially crystalline polybutene-1 can, in a manner known per se, be prepared in accordance with the Ziegler-Natta method by the use of known complex catalyst systems, as described in Belgian Pat. No. 538,782, and especially by use of the catalyst $$Al(C_2H_5)_2Cl/3TiCl_3AlCl_3$$

The polymerization is carried out at, or near atmospheric pressure or at up to 10 atmospheric gage pressure, and at temperatures ranging from 0° to 60° C. In this manner there is obtained an isotactical polymer with a stable rhombohedral modification ("modification 1" as cited in "Polymer Science," vol. 62, pages 870/871 (1962), edition 1964), which in general has $\eta_{red}$-values [1] of 2 to 6 and densities of 0.910 and 0.920. The non-tactical content, which is obtained as a matter of course during polymerization, will not interefere with any processing at later stages—other than possibly with tube production—and therefore need not necessarily be removed (for example, removal by ether extraction) prior to utilization of the substance.

The non-crystalline content of a partially crystalline polymer is usually defined as the non-tactical amorphous content as well as an isotactical content which, although crystallizable, will remain in the non-crystalline, amorphous state by reason of thermodynamic equilibrium. This means that even after removal of the non-tactical phase there will remain a non-crystalline content within the isotactical polymer (polypropylene or polybutene-1) so that the polymer must be designated "partially crystalline." In certain instances, if it is desired to prepare soft, flexible substances, it will even be advantageous to introduce into the combination non-tactical material ($\eta_{red}$-value between 0.5 and 0.8) in quantities ranging from 10 to 40%, relative to the partially crystalline polybutene.

A non-tactical polybutene of such type is prepared, in a manner known per se, by using complex catalyst systems such as titanium chloride/aluminum alkyl combinations, for example the system $TiCl_4/Al(C_2H_5)_3$ as the catalyst mass, and to polymerize in an inert medium, such as n-heptane or butane, at temperatures between 40° and 100° C. Partially crystalline polybutene-1 is employed in quantities ranging from 99.5 to 10 percent by weight, preferably from 98.5 to 18 percent by weight, and in a

---

[1] The reducible specific viscosity $\eta_{red}$ is computed by the formula

$$\eta_{red} = \frac{1}{c} \frac{\eta_L - \eta_o}{\eta_o} \; [dl./g.]$$

whereby $c$ = concentration [g./dl.] = 0.1 in p-xylene at 110° C. $\eta_L$ = viscosity of the solution, $\eta_o$ = viscosity of the solvent. The measurements are carried out by use of an Ostwald or an Ubbelohde viscometer of special sizing (see "Markramol. Chemie," vol. 13 (1954), page 71).

specific case (the production of pressure tube) from 98.5 to 82 percent by weight.

Suitable polypropylenes are prepared, in a manner known per se, according to the Ziegler-Natta method (Belgian Pat. 538,782), for example by use of the catalyst $TiCl/Al(C_2H_5)_3$. The polymerization is carried out at, or near, atmosphereic pressure, or at up to 10 atmospheric gage pressure, and at temperatures ranging from 0° to 100° C. in an inert hydrocarbon such as iospentane or n-heptane. Polypropylenes so obtained are partially crystalline polymers with most of the content that is soluble in boiling n-heptane being removed (non-tactical phase <1 percent by weight). There are suitable, also, copolymers with 0.2 to 10 percent by weight of ethylene or butene-1 which are obtained by carrying out the reaction in the same manner as specified above for the homopolymerization, using the special catalyst and appropriate amounts of ethylene or butene-1. These copolymers possess a degree of crystalliaztion which falls approximately between the values of substances obtained by propylene homo- polymerization (60 to 80%) and polybutene-1 homo- polymerization (40 to 50%), the values being obtained by infrared spectroscopic measurements.

All of the herein-claimed substances, prepared by propylene homo- and copolymerization, have $\eta_{red}$-values of 2 to 5 and densities of 0.901 to 0.907. These polypropylenes are employed in quantities from 0 to 80, preferably 0 to 70 percent by weight, relative to the total mixture; in case of the production of pressure tubes the ratio should be 0 to 5 percent by weight.

In principle, any sulphur-crosslinkable substance such as unsaturated rubber can be used in quantities from 0.4 to 20, preferably 1 to 10, and especially 3 to 7 percent by weight relative to the total mixture. However, it is preferable to select, products having non-polar properties, that is an unsaturated elastomer, and especially an elastomer that is free of heteroatoms and therefore very well compatible with plastomer-type reactants, characterized by having Mooney viscosities ML (1+4) at 100° C. from 40 to 100, preferably 45 to 70.

One operable example is a butadiene-styrene rubber, produced by radical chain polymerization in emulsion and use of redox systems, such as cumenehydroperoxide $+Fe^{++}$; another example is a butyl rubber, produced by ionic polymerization of isobutylene and isoprene at −90° to −100° C. with the aid of aluminum chloride in methylene-chloride; a still further operable example is a cis-1,4-polybutadiene, produced with the aid of an $AlR_3/TiBr_4$ catalyst or an $AlR_3/TiJ_4$ catalyst. Additional operable examples are: an ethylene-propylene rubber, produced through the use of complex catalyst systems in accordance with U.S. Pat. 3,000,866, using vanadium chlorides and aluminum alkyls in tetrachloroethylene at −20° to −100° C., and containing 0.5 to 10 percent by weight of dicyclopentadiene; or an EPT-rubber with a multiene, such as hexadiene-1,4 or 5-ethylidene-2-norbornene (Belgian Pat. 697,049). In principle, there is also usable a masticated natural rubber, or a polar, unsaturated, sulphur-crosslinkable rubber, for example a butadiene-acrylo-nitrile rubber, prepared by emulsion polymerization of the components in the presence of a soap and a wetting agent such as naphthalene sulphonate, as described in published German patent application ("DAS") No. 1,073,205.

There are excluded from use, however, the saturated, peroxide-crosslinkable elastomers; also, synthetic rubber products which can be cross-linked by use of metallic oxide catalysts or which have a high gel content, that is, products which have been vulcanized fully or in part prior to their introduction in the mixture.

Sulphur is used as the cross-linking agent in the form of flowers of sulphur, preferably in combination with zinc oxide and stearic acid, as well as other accelerators, well known in the field of rubber chemistry, such as di-o-tolylguanidine, tetramethylthiuram mono- or -disulphide, mercaptobenzothiazole or pentamethylenedithiocarbamate in a total concentration (sulphur with or without accelerators) of 0.1 to 3 and preferably 0.5 to 2 percent by weight, relative to the total mixture.

The molded substances can also contain antioxidants and stabilizers, for example, 4,4'-butylidene-bis(6-t-butyl-m-cresol), or n-stearoyl-p-aminophenol, or 2-α-methylcyclohexyl-4,6-dimethylphenol, or dibenzylresorcinol, or dilaurylthiodipropionate—the last mentioned substance preferably and advantageously being used in combination with a phenolic antioxidant—or 2-(2'-hydroxy-5-methyl-phenyl)-benzotriazole. There can be included in the mixture, also, a lubricant such as zinc-, Na- or calciumstearate, or paraffin waxes, or pigments; also, fillers such as chalk, silicates, fiber glass, asbestos or soot. Anti-static as well as flame-resistant agents can likewise be present.

It is advantageous to start to prepare the mixtures with thermoplastics which are obtained through the polymerization process in powder form. Added thereto are the elastomers, reduced to small crumbs, and any desired additives (e.g., vulcanizing agents, lubricants pigments, fillers and the like). All of these components are mixed in a fastrunning mixer and are then compacted into a granulate at temperature between 110° and 200° C. The compacting action can also be accomplished simultaneously with the mixing operation by an agglomeration action, at 100 to 140° C., lasting between 3 to 10 minutes. It is also possible to utilize a kneader, heated to 130 to 180° C., and/or a roller, heated to 120 to 160° C., and then to flatten the mixture so obtained to sheet form, cut the sheets into strips and feed these strips into a grinder or a granulator. The granulates or agglomerates so produced can then be shaped by thermoplastic processing machines by following the requirements for the processing of thermoplastic materials generally, by programming the temperature in such manner that it will rise, beginning at the filling funnel and ending at the nozzle, from approximately 110 to ≦250° C. In this manner of operations the gel content within the cylinder will remain at low levels (0 to <3%), and the cross-linking process will be limited, for all practical purposes, to the frontal tool and therefore not interfere with the processing operations. The molded substances, prepared in accordance with the invention, are particularly useful as insulating components in connection with the problem of electrical-stress-cracking,—that is, cracking of the insulation of encased wires in contact with water under powerload, such as coiled wires for underwater motors; they are also useful in the field of tubing because of their outstanding durability behavior under pressure loads.

For the manufacture of tubes it is advantageous to use molded substances which contain:

99.0 to 82 percent by weight of component (a),
0.5 to 5 percent by weight of component (b),
0.4 to 10 percent by weight of component (c), and
0.1 to 3 percent by weight of component (d).

For the manufacture of wire and cable insulation, the values (in wt. percent) are:

(a): 95 to 10, (b): 3 to 80, (c): 1.9 to 20, (d): 0.1 to 3.

In the case of conductive substances (conductor-smoothing ("Glaett") substances), which also possess dimensional stability under heat, the values listed above for wire and cable insulation will apply—to a total of 100 parts by weight—plus 40 to 50 parts by weight of conductive soot.

Example 1(a)

100 parts of a polybutene-1 powder, prepared in accordance with the Ziegler-Natta process and freed of its ether-soluble phase, having a $\eta_{red}$-value of 4.5 and a density of 0.915 (according to DIN 53 479) are mixed with 0.2 part of 4,4'-butylidene-bis(6-t-butyl-m-cresol), and with 0.2 part of dilaurylthiodipropionate, 0.2 part of calcium stearate,
0.2 part of sulphur,
0.3 part of tetramethylthiuramdisulphide,
0.2 part of stearic acid, and
1 part of zinc oxide.

Thereupon, there are added to 96 parts of this basic mixture, at room temperature, 4 parts of crumbled ethylenepropylene-terpolymer containing 4 percent by weight of dicyclopentadiene and which was prepared at room temperature and under atmospheric pressure by the use of a complex catalyst system (VOCL$_3$+ethylaluminumsesquichloride), and which has a Mooney viscosity (ML4-value of 100° C.)—in accordance with DIN 53 523—of 65 and a propylene content of 50 percent by weight. The mixture, so obtained, is compacted into a granulate through a dual-worm extruder at 25 revolutions per minute and 5.5 ampere load, with the temperature of the machine rising 110 to 160° C., beginning at the filling funnel and ending at the nozzle.

Tubes with a diameter of 32 mm. and a wall thickness of 2.45 mm. are then manufactured using an extruder (Reifenhaeuser system) with a cylinder diameter of 60 mm. and use of a short-compression-worm (length=20 D) with a compression ratio of 1:3 and at 30 revolutions per minute—the standard system for polyolefins—the temperature of the machine rising from 150° to 210° C., beginning at the filling funnel and ending at the nozzle. This processing technique which is identical with the processing of standard poly-α-butylene tubes.

The durability of such tubes, determined at 90° C. and a peripheral stress [2] of $\sigma$=60 kp./cm.$^2$, ranges from 8,500 to 10,000 hours, with a mean value of 9,400 hours. This value is greatly superior to the durability values from 5,000 to 7,000 hours, and a mean value of 6,100 hours, the figures being obtained in the case of tube sections made from a poly-α-butylene which was free from admixture with rubber and from admixture with cross-linking agents. Comparable results are also obtained if the amorphous terpolymer is replaced by 4 parts of a butadiene-acrylonitrile copolymer with 28 percent by weight of acrylonitrile and having a Mooney value of 54.

These results are particularly surprising and unexpected because usually it is not feasible to raise the durability time of thermoplastic basic materials by the incorporation of rubber and cross-linking agents. The comparative test, given below, shows that just the opposite is true as regards the mixtures of the present invention.

(b) Comparative example 100 parts of a partially crystalline polypropylene powder, which is completely freed of its non-tactical phase and which has a $\eta_{red}$-value of 5 (dl./g.) and a density of 0.905 g./cm.$^3$, are mixed at room temperature by use of a mixer with
0.2 part of 4,4'-butylidene-bis(6-t-butyl-m-cresol), and with
0.2 part of dilaurylthiodipropionate,
0.2 part of sulphur,
0.3 part of tetramethylthiuramdisulphide,
0.2 part of stearic acid, and
1 part of zinc oxide.

Thereupon there are added to 96 parts of this basic mixture 4 parts of EPDM-rubber, employed in Example 1(a), and all other steps are taken analogous to those of Example 1(a), the only difference being that for the purpose of easing the flow of the material the average temperature level within the machinery is raised by 15° C. However, the material was already near its limit of proper

[2] $\sigma$ is computed by use of the formula:

$$\sigma = \frac{P \cdot dm}{2S}$$

where P=test pressure in kg./cm.$^2$, dm.=average tube diameter in cm., and S=wall thickness.

workability. A comparison of the durability values at $\sigma$=60 kp./cm.$^2$ and 90° C. with tube sections made from unmodified polypropylene material shows that the latter surpass tubes made from the mixture almost by 100%, a mean value of 950 hours.

Example 2

60 parts by weight of the basic polybutene-1 powder mixture—as described in Example 1(a)—and 35 parts by weight of the polypropylene powder—used in the Comparative Example 1(b) and prepared as described therein—are agglomerated in a 150-liter Henschel mixer for 4 minutes at 110° C. together with 4 parts of crumbled EPDM rubber—as utilized also in the two previous examples. The resulting free-flowing powder is then used for the encasing of a 1.3 mm. copper strand with an insulating layer of 0.6 mm. thickness in an extruder equipped with a cross-spray nozzle (system Friesecke and Hoepfner) at 40 revolutions per minute, and at machine temperatures rising from 120° to 210° C., beginning at the filling funnel and ending at the nozzle.

10 meters of the encased wire are wound to form a toroidal coil of 12 cm. diameter, and this coil is immersed in a water bath (tap water) at 70° C. in such manner that the ends of the wire protrude from the water. The ends are welded together and are connected without insulation to one terminal of a 600 volt A-C power source, the other terminal remaining in direct contact with the water bath. Identical steps are taken with wires which have insulations produced from unmodified poly-α-butylene and from the compounded material used for Comparative Example 1(b). It was found that the species prepared in accordance with the present invention have breakdown durabilities in excess of 3,000 hours (the tests can be discontinued after 3,000 hours as the evidence so obtained is practically sufficient), whereby throughout the entire testing period the constancy of the direct-current insulation value (copper strand against water) is observed at regular time periods by use of a 100-volt direct current. In contrast thereto, the durabilities of the comparative species range from 20 hours to a maximum of 400 hours.

It is emphasized that the formulae, as specified for the above described usage, can be varied within very wide ranges; the weight ratio between polypropylene and polybutene-1 can be reversed without basically affecting the excellent electric-stress-cracking property of such mixture. Also, a substitution of the selected polypropylene component, for example with another copolymer:

A propylenebutylene copolymer with a 2 percent by weight of butylene, an $\eta_{red}$-value of 4.8 and a density of 0.902, or a propyleneethylenecopolymer with 6 percent by weight of ethylene, an $\eta_{red}$-value of 5 and a density of 0.901 will not adversely influence the excellent electric-stress-cracking property.

It is also possible to increase the EPDM ratio to 10 or 20 percent by weight while quantitatively reducing one or both components of the mixture without any detrimental effect; in the latter case (20 percent by weight) it will be advisable to operate close to the low limit of the temperatures (140 to 150°) for the plasticizing stage.

Example 3

A mixture is prepared from (a) 72 parts by weight of polybutene-1 powder, prepared as in Example 1(a),
(b) 3 parts by weight of the basic mixture of polypropylene powder described in comparative Example 1(b),
(c) 5 parts by weight of a crumbled butyl rubber, containing 2 percent by weight of isoprene and having a ML4-value of 60, and
(d) 20 parts by weight of an acetylene soot (median particle diameter [EM]43 m$\mu$)

at room temperature and by use of a mixer. After compacting to a granulate the mixture so prepared is processed into tubes analogous to Example 1(a) but with temperatures raised by 5° for all machine settings.

Test results:

Approximate mean durability value at $\sigma=60$ and 90° C.: 9,200 hours. Surface resistivity (at 50% relative humidity and 23° C.) according to DIN [3] 53 482/VDE 0303, part 3:—5.10$^7$Ω.

Welding factor ("Heizspiegel" press welding), determined from the tensile strength in relation to the welding seamless test material (=100%) within a temperature range from 180 to 240° C., and a bearing pressure at the plate of 0.5 kp./cm.$^2$, and a welding compression pressure of 1 and 2 kp./cm.$^2$:—0.9 to 1.

Without the presence of the cross-linking agents the mean durability value would be somewhat higher than 3,400 hours, in other words, the tubes obtained by this process represent lasting antistatic material of excellent weldability, a fact which is unexpected and surprising in view of its substantial soot content and its cross-linked condition.

The admixture of polypropylene also makes it possible to reduce the time for the modifying conversion, that is the transition from the unstable, tetragonal modification, resulting from the fusion (modification 2) to the stable, rhombohedral modification (modification 1), which is not influenced by the cross-linking process as such, from 8 days—when stored at room temperature—to approximately one half of this time.

Example 4

43 parts by weight of a basic mixture of polybutene-1 powder according to Example 1(a), provided with twice the amount of additives, 21 parts by weight of non-tactical polybutene-1 with a $\eta_{red}$-value of 0.7, 4 parts by weight of EPDM rubber, repeatedly used above, and 32 parts by weight of a furnace soot with a mean particle size of 23 m$\mu$ and a specific surface area of 93 m.$^2$/g., are introduced into a kneader (System Banbury), which is heated to 130° C., plasticized, and flattened—by a roller heated to 100° C.—into sheets; these sheets are divided into plate-shaped parts, and the parts are vulcanized in a press for 3 minutes at 170° C. The plates so obtained are soft and flexible and have a specific current-flow resistance (as measured according to DIN 53 482) of only 1.8·10$^2$Ω cm.

It can be stated that semiconductive, flexible, masses are of great interest in the field of cable technology where they can be used, for example, as so-called conductor-smoother for high-tension wires. They will form an intermediate layer between the metallic core conductor and the exterior insulation, and it is their function to reduce peak voltages and to prevent glow discharge at the interface regions. The substance prepared in Example 4 in accordance with the invention is highly advantageous (in comparison with materials used heretofore) in this technological field, because of its great capability to withstand thermal stresses, and the same is particularly valuable when used in combination with insulating materials such as crystalline polybutene-1 or cross-linkable compounds as prepared in Example 2. For example, strips of material produced from the vulcanized plates and hung from wires in an oven heated to 220° C. retained their shape almost perfectly upon removal after remaining there for three weeks. In contrast thereto, the comparative species, without any rubber and cross-linking admixtures, become completely deformed and were almost liquified after a stay of only 30 minutes, similar to other standard products.

The manufacture of conductive substances from this base is not limited to the EPDM rubber used in the examples above given. Comparable results are also obtained through use of a cis-1,4-polybutadiene with a ML4-value of 45, as well as of butadiene-styrene rubber (butadiene: styrene=70:30) with a Mooney viscosity of 58. The manufacture is not limited, either, to the specific soot used in the cases given. A conductive soot (acetylene basis) with a median particle size of 35 m$\mu$—determined by electronic-option means—and a specific surface of 90 m.$^2$/g. will lead to practically identical results.

We claim:

1. Sulphur-crosslinkable molded substance made from partially crystalline and amorphous polymers, characterized by the combination of
    (a) 99.5 to 10 percent by weight of partially crystalline polybutene-1 which can contain up to 40 percent by weight—calculated as to the total amount of polybutene-1—of non-tactical components, and which possesses an $\eta_{red}$-value of 2 to 6 and a density of 0.910 to 0.920,
    (b) 0 to 80 percent by weight of a polypropylene of the group consisting of hompolymers and copolymers of ethylene and butene-1, and which possesses an $\eta_{red}$-value of 2 to 5 and a density of 0.001 and 0.907,
    (c) 0.4 to 20 percent by weight of unsaturated rubber that can be vulcanized with sulphur, and
    (d) 0.1 to 3 percent by weight of a vulcanization agent selected from the group consisting of sulphur and sulphur plus an accelerator of vulcanization.

2. Sulphur-crosslinkable molded substance according to claim 1 for the manufacture of tubes, characterized by the following composition:
    (a) 99.5 to 82 percent by weight of partially crystalline, isotactical polybutene-1,
    (b) 0 to 5 percent by weight of partially crystalline, isotactical polypropylene,
    (c) 0.4 to 10 percent by weight of unsaturated rubber that can be vulcanized with sulphur, and
    (d) 0.1 to 3 percent by weight of a vulcanization agent selected from the group consisting of sulphur and sulphur plus an accelerator of vulcanization.

3. Sulphur-crosslinkable molded substance according to claim 1 for the manufacture of wire and cable insulations, characterized by the following composition:
    (a) 95 to 10 percent by weight of partially crystalline polybutene-1 which may contain up to 40 percent by weight—calculated as to the total polybutene-1—of non-tactical components,
    (b) 3 to 80 percent by weight of partially crystalline, isotactical polypropylene,
    (c) 1.9 to 20 percent by weight of unsaturated rubber that can be vulcanized with sulphur, and
    (d) 0.1 to 3 percent by weight of a vulcanization agent selected from the group consisting of sulphur and sulphur plus an accelerator of vulcanization.

References Cited

UNITED STATES PATENTS

| Patent No. | Date | Name | Class |
|---|---|---|---|
| 3,407,253 | 10/1968 | Yoshimura et al. | 260—897 A |
| 3,123,583 | 3/1964 | Howard et al. | 260—4 R |
| 2,910,451 | 10/1959 | Cantwell | 260—889 |
| 2,927,904 | 3/1960 | Cooper | 260—4 |
| 3,440,208 | 4/1969 | Foglia et al. | 260—897 A |
| 3,356,765 | 12/1967 | Musso et al. | 260—897 A |

FOREIGN PATENTS

| | | | |
|---|---|---|---|
| 1,031,132 | 5/1964 | Great Britain | 260—889 |
| 802,460 | 10/1956 | Great Britain | 260—889 |

JOHN C. BLEUTGE, Primary Examiner

U.S. Cl. X.R.

252—511; 260—23.7 R, 23.7 M, 28.5 B, 41 R, 41 AG, 41.5 R, 45.85, 45.9 R, 45.95, 889, 897 A

---

[3] DIN=Deutsche Industrie-Norm, similar to ASTM.